(12) United States Patent
Haran

(10) Patent No.: US 12,079,058 B2
(45) Date of Patent: Sep. 3, 2024

(54) METHOD FOR LOW-POWER ACTIVATION SCHEME OF A PEDESTRIAN V2X DEVICE

(71) Applicant: AUTOTALKS LTD., Kfar Netter (IL)

(72) Inventor: Onn Haran, Kfar Netter (IL)

(73) Assignee: Autotalks Ltd., Klar Netter (IL)

( * ) Notice: Subject to any disclaimer, the term of this patent is extended or adjusted under 35 U.S.C. 154(b) by 148 days.

(21) Appl. No.: 18/070,578

(22) Filed: Nov. 29, 2022

(65) Prior Publication Data

US 2023/0266812 A1    Aug. 24, 2023

Related U.S. Application Data

(60) Provisional application No. 63/312,169, filed on Feb. 21, 2022.

(51) Int. Cl.
| | |
|---|---|
| G06F 1/00 | (2006.01) |
| G06F 1/3231 | (2019.01) |
| G06F 1/3234 | (2019.01) |
| H04W 4/02 | (2018.01) |
| H04W 4/029 | (2018.01) |
| H04W 4/44 | (2018.01) |

(52) U.S. Cl.
CPC .......... G06F 1/3234 (2013.01); G06F 1/3231 (2013.01); H04W 4/023 (2013.01); H04W 4/025 (2013.01); H04W 4/029 (2018.02); H04W 4/44 (2018.02)

(58) Field of Classification Search
CPC ............................. G06F 1/3234; H04W 4/44
See application file for complete search history.

(56) References Cited

U.S. PATENT DOCUMENTS

| | | | |
|---|---|---|---|
| 2019/0096243 A1* | 3/2019 | Doig | G08G 1/09 |
| 2022/0085899 A1* | 3/2022 | Vukovic | H04L 43/0894 |
| 2022/0141633 A1* | 5/2022 | Gummadi | H04W 76/14 |
| | | | 370/329 |
| 2023/0042723 A1* | 2/2023 | Bathija | H04L 1/0025 |
| 2023/0328489 A1* | 10/2023 | Ladhari | H04W 4/40 |
| | | | 370/338 |
| 2024/0182038 A1* | 6/2024 | Kilaru | B60W 40/06 |

* cited by examiner

*Primary Examiner* — Mohammed H Rehman
(74) *Attorney, Agent, or Firm* — Nathan & Associates; Menachem Nathan

(57) ABSTRACT

Methods for lowering the power consumption of a battery-operated pedestrian V2X device, comprising: determining a location of the pedestrian relative to a road using a physical map, determining whether a movement of the pedestrian is consistent using a heatmap, and based on the location of the pedestrian relative to the road and on the consistency of the pedestrian movement, powering down a V2X functionality inside the pedestrian V2X device by setting a V2X receiver operation cycle, a V2X transmitter activation state and a Global Navigation Satellite System (GNSS) sampling rate, thereby enabling low power operation of the pedestrian V2X device.

15 Claims, 6 Drawing Sheets a) Walking outside: TX on
701 b) Entering house: TX on
702 c) Sitting: TX off
703 d) Walking inside house: TX on
704 e) Returning to door: TX off
705 f) Exiting house: TX on
Updating NVM
706

METHOD FOR LOW-POWER ACTIVATION SCHEME OF A PEDESTRIAN V2X DEVICE

CROSS REFERENCE TO RELATED APPLICATIONS

This application claims priority from U.S. Provisional Patent Application No. 63/312,169 filed Feb. 21, 2022, which is incorporated herein by reference in its entirety.

FIELD

Embodiments disclosed herein relate generally to a low-power activation method (also referred to as "scheme") scheme of a pedestrian vehicle-to-everything (V2X) device, and in particular to a scheme for self-learning relevant blocks for V2X activation based on identifying access to nearby roads for powering down the V2X functionality inside a battery-operated device. As used herein, "V2X activation" refers to activation of the pedestrian V2X device for reception ("RX") and/or transmission ("TX"). Hereinafter, "V2X" may be used in short for "V2X device", "V2X functionality", "V2X capability", or any other parameter or action related to V2X communications.

BACKGROUND

V2X can protect all road users through direct communication. Vehicles were the first to add V2X devices (with "V2X functionality" or "V2X capability") followed by two-wheelers. Pedestrians, who account for about 30% of all road fatalities, can use V2X as well (i.e. with pedestrian V2X devices).

One of the major challenges of a pedestrian V2X device (which is battery operated) is power consumption. Battery-operated handheld devices, like Smartphones, Smartwatches, fitness trackers, and other wearables are the most suitable for adding V2X. Battery life, as measured by days between charges, is a key selling point. V2X can be added only if battery life is not shortened noticeably. V2X implementation should be as low-power as possible, but even a V2X implementation designed for low-power will not reach the power consumption target if activated without need.

A simple scheme like activating the V2X functionality only when other V2X messages are received is ineffective, because messages are received even when a pedestrian has no potential interaction with vehicles, such as at home or in a shopping center. Relying on handheld device movement sensors for activation is ineffective as well, since people do walk at home or in a shopping center. Similarly, activating the V2X only outdoors based on Global Navigation Satellite System (GNSS) satellite visibility is an inaccurate criterion, since satellite reception availability can be limited in an urban environment where V2X needs to be activated, and on the other hand, the pedestrian can be outdoor, hiking, or in a playground, without the need to activate V2X. Maps can be used effectively, but maps are not always updated, and presence of a pedestrian near a road does not mean that the pedestrian is walking on a sidewalk.

An optimized method (scheme) that activates the V2X functionality only when a pedestrian is near an accessible road is needed to enable low power operation of a V2X in battery-operated handheld devices.

SUMMARY

In various embodiments (examples), there is provided in a V2X environment in which a pedestrian V2X device associated with a pedestrian is in communication with vehicle and/or infrastructure V2X devices, a method comprising: determining a location of the pedestrian relative to a road using a physical map; determining whether a movement of the pedestrian is consistent using a heatmap; and based on the location of the pedestrian relative to the road and on the consistency of the pedestrian movement, powering down a V2X functionality inside the pedestrian V2X device by setting a V2X receiver operation cycle, a V2X transmitter activation state and a Global Navigation Satellite System (GNSS) sampling rate, thereby enabling low power operation of the pedestrian V2X device.

In some examples, the powering down of the V2X functionality inside the pedestrian V2X device by setting a V2X transmitter activation state includes comparing a distance between the pedestrian and the road to a first threshold, and, if the distance is equal to or larger than the first threshold, deactivating the V2X transmitter.

In some examples, the powering down of the V2X functionality inside the pedestrian V2X device by setting a V2X transmitter activation state includes comparing a distance between the pedestrian and the road to a first threshold, and, if the distance is smaller than the first threshold and if the pedestrian movement is not consistent, deactivating the V2X transmitter.

In some examples, the powering down of the V2X functionality inside the pedestrian V2X device by setting a GNSS receiver sampling rate (or simply "GNSS sampling rate") includes comparing a distance between the pedestrian and the road to a first threshold, and, if the distance is equal to or larger than the first threshold, selecting and setting a lowest GNSS sampling rate.

In some examples, the powering down of the V2X functionality inside the pedestrian V2X device by setting a GNSS sampling rate includes comparing a distance between the pedestrian and the road to a first threshold, and, if the distance is smaller than the first threshold, checking if the V2X transmitter is active, and if the V2X transmitter is not active and if the pedestrian movement is not consistent, selecting and setting a lowest GNSS sampling rate.

In some examples, a method as above or below further comprises calculating a grade for a road definition completeness level, wherein the powering down of a V2X functionality inside the pedestrian V2X device by setting a V2X receiver operation cycle includes setting the V2X receiver operation cycle based on the grade.

In some examples, a method as above or below further comprises calculating a grade for a road definition completeness level, wherein the powering down of a V2X functionality inside the pedestrian V2X device by setting a V2X receiver operation cycle includes setting the V2X receiver operation cycle based on the grade.

In exemplary embodiments, there is provided a pedestrian V2X device associated with a pedestrian, comprising: a V2X unit comprising a V2X transmitter and a V2X receiver; a GNSS unit for providing a location of the pedestrian; and a processor configured to determine the location of the pedestrian relative to a road and to determine whether a movement of the pedestrian is consistent, and, based on the location of the pedestrian relative to the road and on the consistency of the pedestrian movement, to power down a V2X functionality inside the pedestrian V2X device by setting an operation cycle of the V2X receiver, an activation state of the V2X transmitter and a GNSS sampling rate, thereby enabling low power operation of the pedestrian V2X device.

In some examples, a pedestrian V2X device further comprises an inertial device for providing the movement of the pedestrian.

In some examples, the processor configuration to power down the V2X functionality inside the pedestrian V2X device by setting a V2X transmitter activation state includes a configuration to compare a distance between the pedestrian and the road to a first threshold, and, if the distance is equal to or larger than the first threshold, to deactivate the V2X transmitter.

In some examples, the processor configuration to power down the V2X functionality inside the pedestrian V2X device by setting a V2X transmitter activation state includes a configuration to compare a distance between the pedestrian and the road to a first threshold, and, if the distance is smaller than the first threshold and if the pedestrian movement is not consistent, to deactivate the V2X transmitter.

In some examples, processor is configured to determine that the pedestrian movement is not consistent if the pedestrian is residing in a block of the heatmap more frequently than a second threshold.

In some examples, the processor configuration to power down the V2X functionality inside the pedestrian V2X device by setting a GNSS sampling rate includes a configuration to compare a distance between the pedestrian and the road to a first threshold, and, if the distance is equal to or larger than the first threshold, to select and set a lowest GNSS sampling rate.

In some examples, the processor configuration to power down the V2X functionality inside the pedestrian V2X device by setting a GNSS sampling rate includes a configuration to compare a distance between the pedestrian and the road to a first threshold, and, if the distance is smaller than the first threshold, to checking if the V2X transmitter is active, and if the V2X transmitter is not active and if the pedestrian movement is not consistent, to select and set a lowest GNSS sampling rate.

In some examples, the processor is configured to calculate a grade for a road definition completeness level, wherein the powering down of a V2X functionality inside the pedestrian V2X device by setting a V2X receiver operation cycle includes setting the V2X receiver operation cycle based on the grade.

BRIEF DESCRIPTION OF THE DRAWINGS

Non-limiting examples of embodiments disclosed herein are described below with reference to drawings attached hereto that are listed following this paragraph. The drawings and descriptions are meant to illuminate and clarify embodiments disclosed herein and should not be considered limiting in any way. In the drawings.

DETAILED DESCRIPTION

Figure 1:
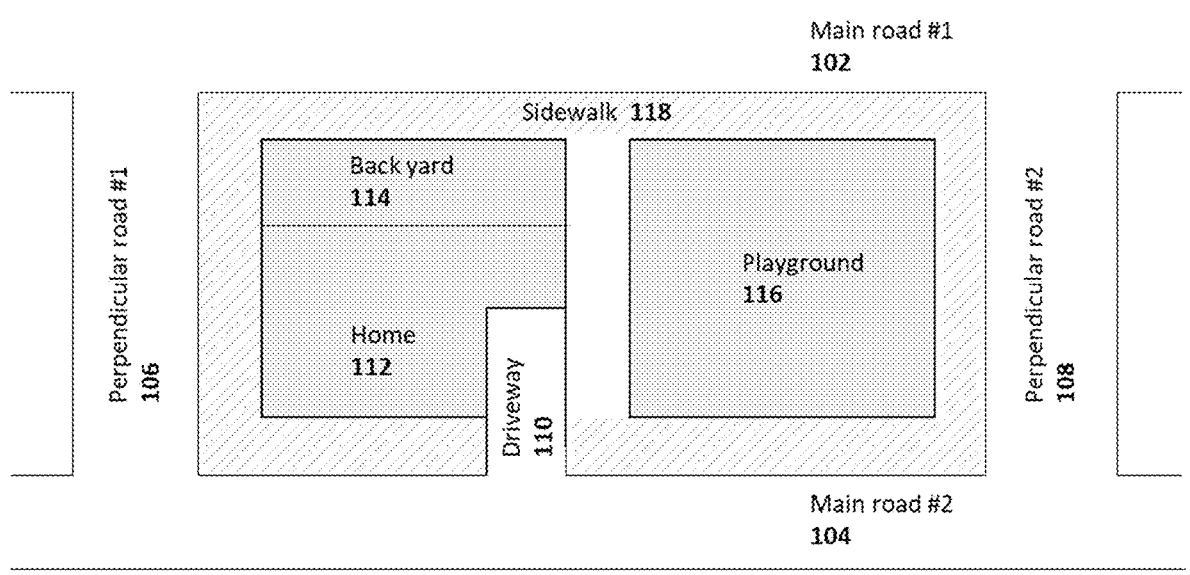
FIG. 1 illustrates an exemplary map highlighting blocks of required V2X activation.

FIG. 1 illustrates a map of an exemplary environment for performance of a method disclosed herein, the map highlighting blocks of required V2X activation. The map shows an arbitrary neighborhood with two main roads, 102 and 104, and two side perpendicular roads, 106 and 108. A V2X communication range can reach several hundred meters, therefore a pedestrian (not shown) carrying a battery-operated device with V2X capability is within the V2X range of vehicles travelling on any of the indicated roads even when inside a home 112, a backyard 114, or a nearby playground 116. If the V2X activation of the pedestrian V2X device is based solely on the reception of V2X messages, the V2X functionality would be constantly activated, draining the battery. A map can provide a good starting point, but the boundaries between curbs and private areas are not typically well defined. With a scheme suggested herein, V2X will operate only when a pedestrian will walk on sidewalk 118 or driveway 110. As such, the scheme has the potential to reduce the V2X activation by a factor of 10 or more, compared to the brute force methods mentioned above.

Figure 2:
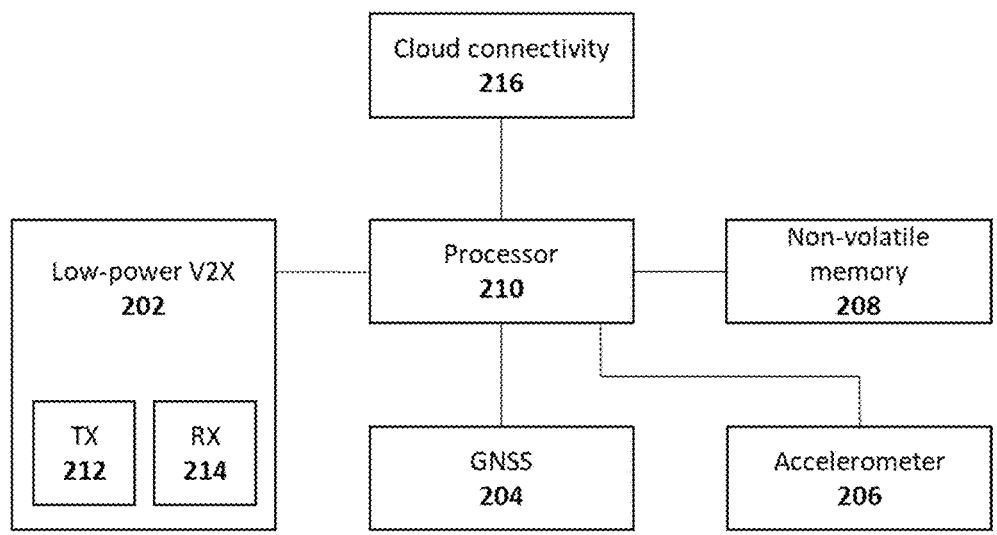
FIG. 2 illustrates a block diagram of a battery-operated device implementing a low-power V2X activation scheme.

FIG. 2 illustrates in a block diagram an exemplary battery-operated V2X device disclosed herein and numbered 200, which may implement low-power activation schemes described below. Device 200 includes a low-power V2X unit 202 for transmitting and receiving V2X messages, a GNSS unit 204 for providing the location of the pedestrian, an inertial device (e.g. an accelerometer) 206, a non-volatile memory (NVM) 208, and a processor (or a "central processing unit"—CPU) 210. V2X unit 202 includes a transmitter (TX) 212 and a received (RX) 214. Additional optional blocks may be added to the device to perform non-V2X functionality, such as a cloud connectivity unit 216 for downloading maps, either directly using WiFi or cellular network, or tethered using Bluetooth.

Low-power V2X unit 202 is optimized for low power consumption while operating, see e.g. the optimization scheme described in co-owned U.S. patent application Ser. No. 17/889,411. In addition, the V2X unit is enhanced to control the operation of TX 212 and an activation cycle time of RX 214, as described below. The control is provided by processor 210, which is also responsible to compose transmitted V2X messages and process received V2X messages. Processor 210 uses location information from GNSS unit 204 to fill in a message field with information about of the pedestrian location in the transmitted messages, and to assess potential safety risks to the pedestrian from nearby vehicles based on the received messages. In addition, the GNSS location is used to determine the required activation of the V2X functionality and to automatically adjust a heatmap based on the pedestrian location. "Heatmap" is a commonly used term that indicates the number of occurrences of an event in an array of blocks. Here and for example, the event is the presence of a pedestrian inside a specific square, for example a square of 1×1 m². Any entrance to the same block that increases a counter value by 2 means that the pedestrian entered the same block twice. The heatmap is a dynamic moving map centered around the current location of the pedestrian. Accelerometer 206 indicates to processor 210 the movements of the pedestrians for determining inactivity and the GNSS receiver sampling rate. Processor 210 uses NVM 208 to store code and data, specifically the most frequently used heatmap blocks, along with their nearby roads, to prevent rebuilding the heatmap on every occasion the pedestrian is in those locations.

Figure 3:
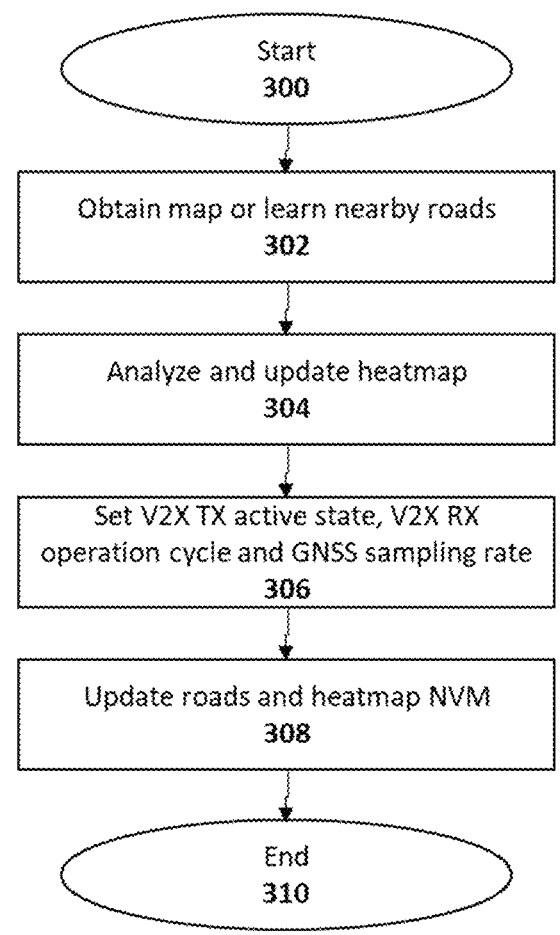
FIG. 3 illustrates a flow chart of low-power V2X activation.

FIG. 3 illustrates a flow chart (representing a state machine) of a method for low-power V2X operation disclosed herein. The method is executed in processor 210. The operation starts periodically in step 300. The period (also referred to below as "operation cycle" or "activation cycle")

between V2X (RX and/or TX) activations varies based on the previous outcome of the state machine. The RX and TX activations can be different. RX can be activated without TX, but not the other way around. So the basic activation operation is to set a RX period, during which period TX is either ON or OFF. The less often a device like device 200 is activated, the more power is saved. The RX period (determined/set as described below) varies between 0.1 seconds to 10 seconds, typically aligned with the GNSS sampling rate. Next, in step 302, if a physical map (or just "map"—not shown) is not available for the current location, such a map is obtained from a cloud computing environment. If connectivity does not exist, or the location of received V2X units does not match the map, then nearby roads are learned based on the received V2X messages. The map is used to determine the proximity of the pedestrian to roads. Next, in step 304, the pedestrian presence inside a heatmap block is analyzed and updated. Next, in step 306, the V2X RX operation cycle is determined based on the location of the pedestrian relative to the road and on the location of the pedestrian inside a heatmap block. For details, see step 614 below. The GNSS sampling rate is determined and set as well, see e.g. FIG. 6. Next, in step 308, the NVM storing the most used heatmap blocks and nearby roads is updated if needed. If the heatmap block entry is already in the NVM, meaning a prior heatmap with the same location is stored, the NVM heatmap block entry is marked as recently used or "fresh", and the heatmap parameters are updated if needed. If the current heatmap does not appear in the NVN, then it is added to it, and if the NVM is full, at the expense of the least recently used entry. Lastly, the operation ends at step 310.

Figure 4:
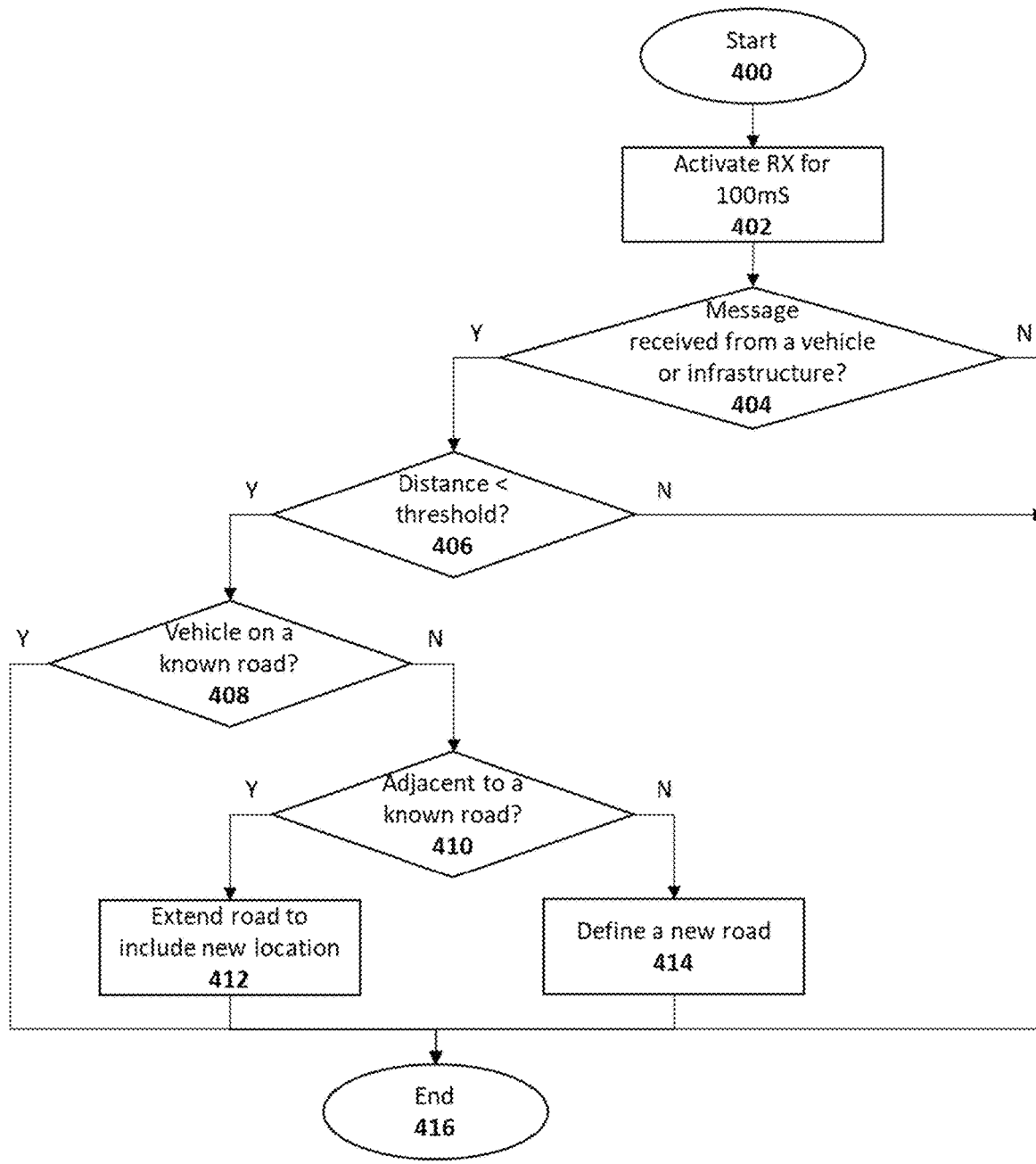
FIG. 4 illustrates a flow chart of learning nearby roads.

FIG. 4 illustrates a flow chart of learning nearby roads, detailing the operation of step 302, used to obtain an updated physical map. Operation starts at step 400. Next, at step 402, RX scanning is activated for 100 mS. According to the V2X specification, a vehicle transmits every 100 mS, in a semi-random time inside the 100 mS cycle. Therefore, the entire 100 mS cycle should be scanned by the pedestrian V2X device to receive messages from other vehicles. Next, in step 404, the origin of each received message is checked. If the message is neither from a vehicle nor from a V2X road side unit (RSU), then it is ignored. Road users other than vehicles of RSUs, like bikes and pedestrians, may use paths that are not roads, hence messages from such road users can only confuse the learning process. Notice that messages from bikes are processed for detection of a potential safety risk, and only ignored in the context of the actions of FIG. 4. If the message should be ignored, the operation ends at step 416. Otherwise, the operation continues from step 406. The distance between the pedestrian and the vehicle or RSU sending the message is calculated. If the distance is equal to or greater than a first threshold, for example 50 meters, then the message is ignored, and the operation ends at step 416. A vehicle or RSU further away than the first threshold has no safety relevance to a pedestrian and should be ignored to save processing power. If the distance is smaller than the first threshold, the operation continues from step 408. A check is performed if the vehicle is on a known road, i.e. a road that was previously learned. If yes, no further processing is needed, and the operation ends at step 416. Otherwise, the operation continues to step 410. A check is made if the location received in the message extends (i.e. represents a virtual extension of a) known road, meaning the previous location of the vehicle was on a road and the recently received location are within a short distance, for example, 1.5 meters from the edge of that road. If yes, a road extension to include the received location is performed in step 412. A road is defined as a collection of contiguous straight segments. If the new vehicle location can extend the segment without introducing an error to the location of the previous road end (i.e. the last point known for a road and the same point that is extended when a new message is received), the segment is extended to the latest vehicle location. If extending the segment implies that the previous road end diverges from its current value, as will happen with curves, then a new road segment is created, with its starting point being equal to the end of the previous road segment, and its endpoint equals to the vehicle location. If the vehicle location is not within a short distance from an existing road, then in step 414 a new road is defined between the prior location of the vehicle and the current one, thereby updating the physical map. Next, the operation ends at step 416.

Figure 5:
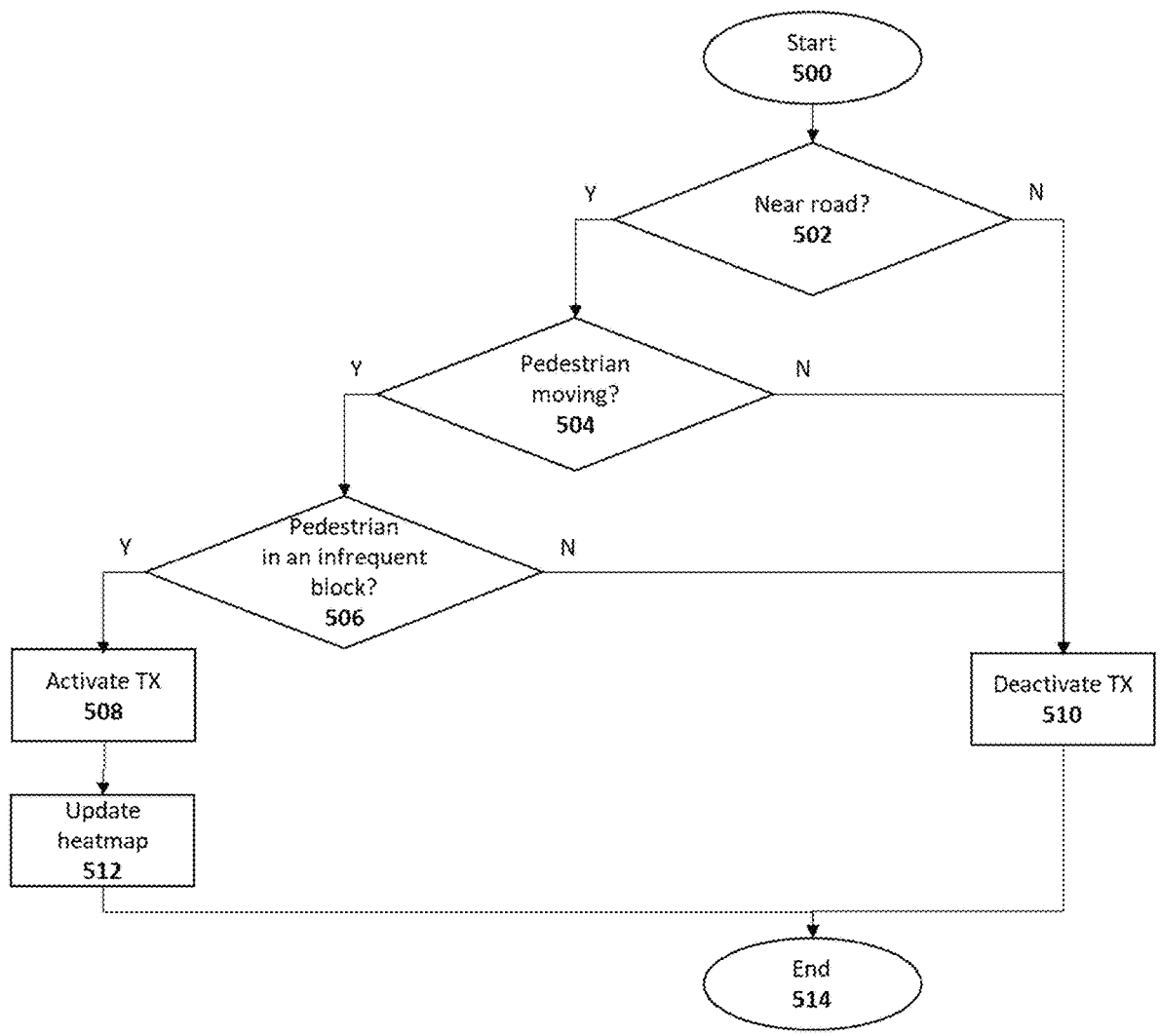
FIG. 5 illustrates a flow chart of a heatmap update.

FIG. 5 illustrates a flow chart of a heatmap block update, detailing the operation of step 304, operative to analyze and update the heatmap block. The operation begins at step 500. Next, at step 502, a check is made if the pedestrian is nearby a road, i.e. a distance between the pedestrian and the road is compared to a second threshold. The distance between the pedestrian to a road should be smaller than the second threshold, for example, 15 meters. If the distance is equal to or greater than the second threshold, the operation continues from step 510, TX 212 is deactivated, and the operation ends at step 514. If the distance is smaller than the second threshold, the operation continues to step 504, in which a check is made if the pedestrian is moving. The check uses accelerometer 206 to determine the movement of the pedestrian. A temporary lack of movement is ignored, until a certain time passes, relative to the pedestrian's distance from the road. The motivation is to distinguish for example between a pedestrian waiting for a traffic light to turn green and a pedestrian sitting on the couch at home. When the pedestrian is on the edge of the road, the transmission should continue, but if further away, the transmission should stop. For example, the pedestrian is declared as not moving only after (200/distance in meters) seconds have passed.

If in general the pedestrian does not move during the calculated duration, the operation continues from step 510, in which TX 212 is deactivated. Otherwise (i.e. if the check in step 504 indicates that the pedestrian is moving), the operation continues to step 506. A check is made if the pedestrian is in an infrequently used heatmap block. "Infrequently used" means that the current counter value of the heatmap at the current pedestrian location is smaller than a third threshold (e.g. typically and exemplarily 4), i.e. the pedestrian was (resided) fewer than 4 times in the heatmap block since the block became part of the heatmap. If yes (i.e. infrequent use of the block), this indicates that the pedestrian is moving consistently (i.e. not going back-and-forth) and the operation continues from step 508 in which TX 212 is activated. To clarify, the term "consistent movement" refers to a non-random, directed movement of the pedestrian. If no in step 506, the operation continues from step 510, in which TX 212 is deactivated. Next, in step 512, the heatmap is updated. The heatmap array size should be aligned with the value of the threshold of step 502. That is, if the second threshold is 15 meters, and the size of each heatmap block is 1 meter, then the array should be 15×15 m². When a pedestrian moves outside the boundaries of a block, the array shifts to keep the pedestrian location centralized. The blocks that are going out of array boundaries are deleted. Instead, blocks are added on the opposite end, initialized to 0. The center block value, in which the pedestrian is located, is incremented upon every shift. Next, the operation ends at step 514.

Figure 6:
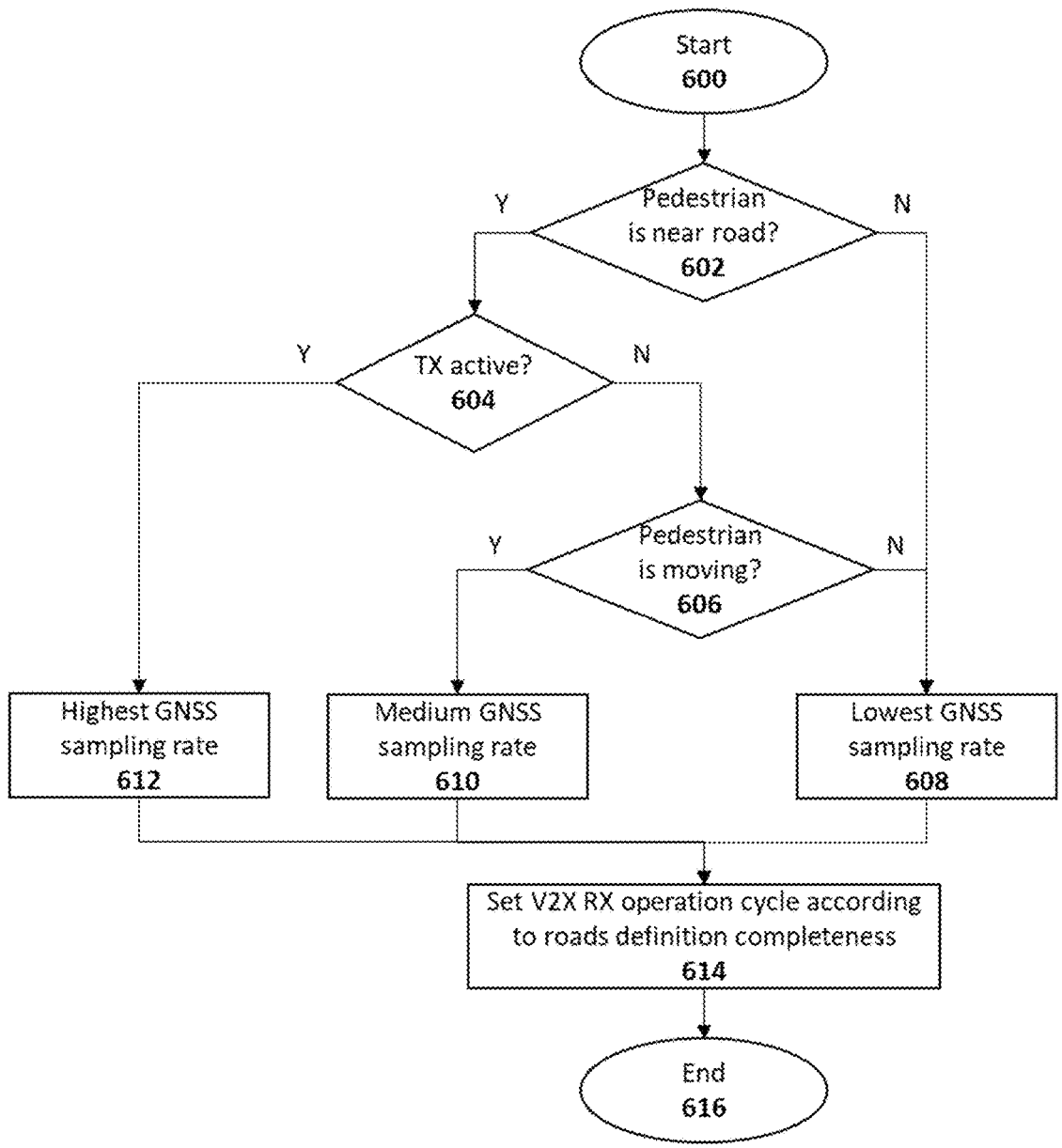
FIG. 6 illustrates a flow chart of the updating of the GNSS sampling rate and V2X RX operation cycle.

FIG. 6 illustrates a flow chart of the updating of the GNSS receiver sampling rate and V2X RX operation cycle, detailing the operation of step 306. The operation begins at step 600. Next, at step 602, it is checked if the pedestrian is near a road, similar to check 502. If not, the operation continues to step 608, where the lowest GNSS sampling rate, typically 10 seconds or 0.1 Hz, is selected. Potentially, the device can overrule this value if a faster GNSS update of the sampling rate is needed for other tasks. Otherwise, the operation continues from step 604. A check is made if the TX is active, as determined in step 304. If yes, the highest GNSS sampling rate, 10 Hz, is set at step 612. If not, the operation continues from step 606, which checks if the pedestrian is moving. The check in step 606 may be based purely on the movement of accelerometer 206, without the additional timing checks applied in step 504. If the pedestrian is not moving, then the operation continues to step 608, setting the lowest GNSS sampling rate. If the pedestrian is moving, then a medium GNSS sampling rate, such as 1 Hz, is set in step 610. The reason for the medium rate is to maintain the ability to turn on quickly the TX after detecting that the pedestrian is getting closer to a road, while not needing the maximal GNSS sampling rate, which is needed only while TX is on.

Steps 608, 610, and 612 continue to step 614. In step 614, a grade is calculated for road definition completeness level (or just "completeness"). If messages are received, then there is a road. If all the roads are known, then there is no need to scan the roads (RX scan frequency=0), and the decision whether to operate can depend only on the location. However, if the roads are only partially known, then reception (RX activity) is needed more frequently to detect coming vehicles. The completeness is checked within a virtual circle drawn around the pedestrian with a radius equal to the first threshold used in step 404, typically 50 meters. Several factors determine the grade: if V2X messages are not received, and no road exists, then the definition is complete. If the definition is incomplete, then the RX scanning should continue. RX scanning is required if no V2X message is received and if there is a road. If the road does not span the entire radius, i.e. it is shorter than 50 m, then it is suspected to be incomplete, and scanning is needed. Scanning is performed rarely, for example, every 60 seconds, or movement of 25 meters, whatever comes earlier. If roads are well defined, as indicated by consistent road segments, spanning from one edge of the checked circle to another edge, then infrequent scanning is applied as well. An infrequent scan is needed also when the roads were retrieved from NVM. Next, the operation ends at step 616.

Scanning means that the RX is activated for 100 mS. If a message is received from a vehicle inside the virtual circle, then the RX is kept activated until the vehicle exits the circle for extending the road. If no relevant vehicle is received, then RX is deactivated till the next scan. The higher the number of standalone (i.e. not connected to another road) and short (i.e. not spanning from one side of the circle to the other) roads in the circle, the lower the completeness level. The scanning should then be done more often, e.g. every 1-2 second or during a movement of 5 meters. If almost complete, the scanning can be done every 10-20 seconds or e.g. the time for a movement of 10 meters.

Figure 7:
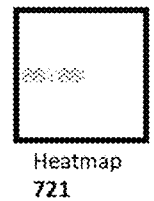
FIG. 7 illustrates an example of the operation of a low-power V2X activation scheme.
Figure 7:
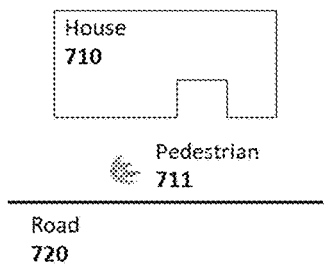
Figure 7:
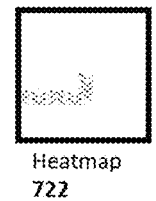
Figure 7:
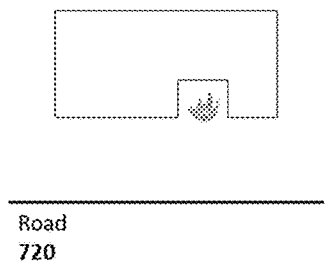
Figure 7:
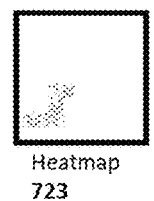
Figure 7:
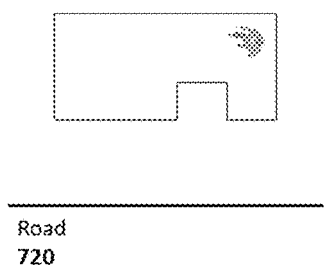
Figure 7:
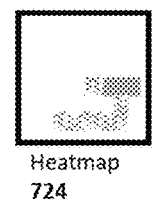
Figure 7:
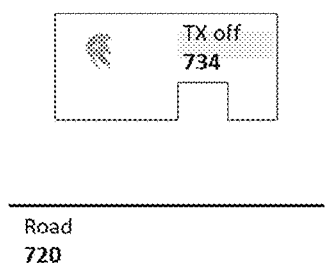
Figure 7:
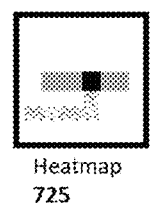
Figure 7:
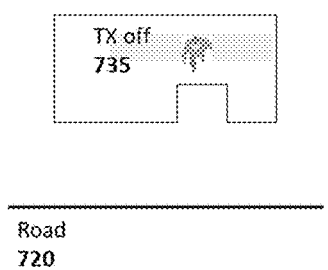
Figure 7:
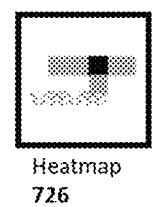
Figure 7:
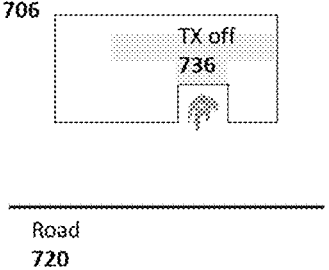

FIG. 7 illustrates an example of the operation of the low-power V2X activation scheme. The scenario involves a pedestrian 711 who enters a house 710 without a prior heatmap, either because the pedestrian has not been in this house before or because the heatmap was not stored in the NVM. Six steps are shown in the example, starting with 701 and ending with 706. For each step, a respective heatmap 721 to 726 is displayed. That is, 701 is associated with heatmap 721, 702 with 722, 703 with 723, 704 with 724, 705 with 725, and 706 with 726. Initially, in 701, the pedestrian is walking on the sidewalk, outside the house. Since the pedestrian is in the proximity of a road (720), the TX is turned on. Heatmap 721, centered on the current location of the pedestrian, shows the historical path of the pedestrian left to the current block. The value of the central heatmap block is increased whenever the pedestrian enters the central block. The path of the pedestrian to the current location, which is the center of the heatmap, has a value of 1, as opposed to 0 in all other blocks, on which the pedestrian did not step. Therefore, by viewing all blocks with a non-zero value, the path of the pedestrian till reaching the current location is shown. Next, in 702, the pedestrian walks toward, and is next to the door of the house. TX is still on since the distance to road 720 is smaller than the threshold of step 502. Heatmap 722 reflects the pedestrian movement. Next, in 703, the pedestrian sits inside the house. TX is turned off since the pedestrian is static above the minimal inactivity period. Next, in 704, the pedestrian walks inside the house. Since the pedestrian previously walked on those heatmap blocks, their value is higher, as indicated by the darker shade or "color". If they reach the threshold of step 506, such blocks would be marked as "used frequently", as shown in 734, and once the pedestrian will reach those again, TX would be disabled. Next, in 705, the pedestrian returns to the door. The current heatmap block value crosses the threshold of step 506, and TX is turned off. Higher block values of heatmap 725 are represented by darker color, as the current block is colored black. In 706, the pedestrian leaves the house, and TX is turned on. If and when the pedestrian will reach the house again comes back to the house, the heatmap will be loaded from the NVM, and the TX will be turned off.

It is appreciated that certain features of the presently disclosed subject matter, which are, for clarity, described in the context of separate examples, may also be provided in combination in a single example. Conversely, various features of the presently disclosed subject matter, which are, for brevity, described in the context of a single example, may also be provided separately or in any suitable sub-combination.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

It should be understood that the use of the terms "first", "second" and "third" as related to thresholds meant just to indicate that such thresholds are different from each other.

Some stages of the aforementioned methods may also be implemented in a computer program for running on a computer system, at least including code portions for performing steps of a the relevant method when run on a programmable apparatus, such as a computer system or enabling a programmable apparatus to perform functions of a device or system according to the disclosure. Such methods may also be implemented in a computer program for running on a computer system, at least including code portions that make a computer execute the steps of a method according to the disclosure.

While this disclosure has been described in terms of certain examples and generally associated methods, alterations and permutations of the examples and methods will be apparent to those skilled in the art. The disclosure is to be understood as not limited by the specific embodiments described herein, but only by the scope of the appended claims.

What is claimed is:

1. In a vehicle-to-everything (V2X) environment in which a pedestrian V2X device associated with a pedestrian is in communication with vehicle and/or infrastructure V2X devices, a method comprising:
   determining a location of the pedestrian relative to a road using a physical map;
   determining whether a movement of the pedestrian is consistent using a heatmap; and
   based on the location of the pedestrian relative to the road and on the consistency of the pedestrian movement, powering down a V2X functionality inside the pedestrian V2X device by setting a V2X receiver operation cycle, a V2X transmitter activation state and a Global Navigation Satellite System (GNSS) sampling rate, thereby enabling low power operation of the pedestrian V2X device.

2. The method of claim 1, wherein the powering down of the V2X functionality inside the pedestrian V2X device by setting a V2X transmitter activation state includes comparing a distance between the pedestrian and the road to a first threshold, and, if the distance is equal to or larger than the first threshold, deactivating the V2X transmitter.

3. The method of claim 1, wherein the powering down of the V2X functionality inside the pedestrian V2X device by setting a V2X transmitter activation state includes comparing a distance between the pedestrian and the road to a first threshold, and, if the distance is smaller than the first threshold and if the pedestrian movement is not consistent, deactivating the V2X transmitter.

4. The method of claim 3, wherein the pedestrian movement is not consistent if the pedestrian is residing in a block of the heatmap more frequently than a second threshold.

5. The method of claim 1, wherein the powering down of the V2X functionality inside the pedestrian V2X device by setting a GNSS sampling rate includes comparing a distance between the pedestrian and the road to a first threshold, and, if the distance is equal to or larger than the first threshold, selecting and setting a lowest GNSS sampling rate.

6. The method of claim 1, wherein the powering down of the V2X functionality inside the pedestrian V2X device by setting a GNSS sampling rate includes comparing a distance between the pedestrian and the road to a first threshold, and, if the distance is smaller than the first threshold, checking if the V2X transmitter is active, and if the V2X transmitter is not active and if the pedestrian movement is not consistent, selecting and setting a lowest GNSS sampling rate.

7. The method of claim 1, further comprising calculating a grade for a road definition completeness level, and wherein the powering down of a V2X functionality inside the pedestrian V2X device by setting a V2X receiver operation cycle includes setting the V2X receiver operation cycle based on the grade.

8. A pedestrian vehicle-to everything (V2X) device associated with a pedestrian, comprising:
   a V2X unit comprising a V2X transmitter and a V2X receiver;
   a Global Navigation Satellite System (GNSS) unit for providing a location of the pedestrian; and
   a processor configured to determine the location of the pedestrian relative to a road and to determine whether a movement of the pedestrian is consistent, and, based on the location of the pedestrian relative to the road and on the consistency of the pedestrian movement, to power down a V2X functionality inside the pedestrian V2X device by setting an operation cycle of the V2X receiver, an activation state of the V2X transmitter and a GNSS sampling rate, thereby enabling low power operation of the pedestrian V2X device.

9. The pedestrian V2X device of claim 8, further comprising an inertial device for providing the movement of the pedestrian.

10. The pedestrian V2X device of claim 8, wherein the processor configuration to power down the V2X functionality inside the pedestrian V2X device by setting a V2X transmitter activation state includes a configuration to compare a distance between the pedestrian and the road to a first threshold, and, if the distance is equal to or larger than the first threshold, to deactivate the V2X transmitter.

11. The pedestrian V2X device of claim 8, wherein the processor configuration to power down the V2X functionality inside the pedestrian V2X device by setting a V2X transmitter activation state includes a configuration to compare a distance between the pedestrian and the road to a first threshold, and, if the distance is smaller than the first threshold and if the pedestrian movement is not consistent, to deactivate the V2X transmitter.

12. The pedestrian V2X device of claim 11, wherein processor is configured to determine that the pedestrian movement is not consistent if the pedestrian is residing in a block of the heatmap more frequently than a second threshold.

13. The pedestrian V2X device of claim 8, wherein the processor configuration to power down the V2X functionality inside the pedestrian V2X device by setting a GNSS sampling rate includes a configuration to compare a distance between the pedestrian and the road to a first threshold, and, if the distance is equal to or larger than the first threshold, to select and set a lowest GNSS sampling rate.

14. The pedestrian V2X device of claim 8, wherein the processor configuration to power down the V2X functionality inside the pedestrian V2X device by setting a GNSS sampling rate includes a configuration to compare a distance between the pedestrian and the road to a first threshold, and, if the distance is smaller than the first threshold, to checking if the V2X transmitter is active, and if the V2X transmitter is not active and if the pedestrian movement is not consistent, to select and set a lowest GNSS sampling rate.

15. The pedestrian V2X device of claim 14, wherein the processor is configured to calculate a grade for a road definition completeness level, wherein the powering down of a V2X functionality inside the pedestrian V2X device by setting a V2X receiver operation cycle includes setting the V2X receiver operation cycle based on the grade.

* * * * *